(12) United States Patent
Koishi (10) Patent No.: US 6,922,736 B2
(45) Date of Patent: Jul. 26, 2005

(54) COMPUTER SYSTEM AND DATA PROCESSING METHOD

(75) Inventor: Takahiro Koishi, Tokyo (JP)

(73) Assignee: NEC Corporation, Tokyo (JP)

( * ) Notice: Subject to any disclaimer, the term of this patent is extended or adjusted under 35 U.S.C. 154(b) by 190 days.

(21) Appl. No.: 10/614,238

(22) Filed: Jul. 8, 2003

(65) Prior Publication Data

US 2004/0006656 A1 Jan. 8, 2004

(30) Foreign Application Priority Data

Jul. 8, 2002 (JP) ........................................ 2002-198991

(51) Int. Cl.[7] ................................................ G06F 3/00
(52) U.S. Cl. ............................. 710/5; 710/58; 712/25; 712/30; 712/31; 712/48; 714/34; 714/203
(58) Field of Search ......................... 710/5, 59; 712/34, 712/203; 714/25, 30, 31, 48

(56) References Cited

U.S. PATENT DOCUMENTS

| 3,302,182 A | 1/1967 | Lynch et al. ............. 340/172.5 |
| 5,138,611 A | 8/1992 | Carn et al. .................... 370/60 |
| 5,319,775 A | 6/1994 | Loges et al. ................. 395/575 |
| 5,675,807 A * | 10/1997 | Iswandhi et al. ........... 710/260 |
| 6,212,651 B1 * | 4/2001 | Schieve et al. ............... 714/36 |
| 6,233,702 B1 * | 5/2001 | Horst et al. ................... 714/48 |

FOREIGN PATENT DOCUMENTS

| EP | 0 380 851 A2 | 8/1990 |
| JP | A 9-114789 | 5/1997 |

OTHER PUBLICATIONS

Dell Computer Corporation: "Infiniband Architecture: Next-Generation Server I/O," 2000, pp. 1–10, internet article, XP002242048.

* cited by examiner

*Primary Examiner*—Jeffrey Gaffin
*Assistant Examiner*—Alan S Chen
(74) *Attorney, Agent, or Firm*—Young & Thompson (57) ABSTRACT

A computer system has a node and a service processor (SVP) connected together via a diagnosis section. An input/output (I/O) unit is connected to the SVP. The diagnosis section has a serial controller. The SVP writes data to be transmitted to the node from the I/O unit into the serial controller. The node reads data stored in the serial controller. The node also writes data to be transmitted to the I/O unit into the serial controller. The serial controller instructs the SVP to read the data written by the node. The SVP reads this data and sends it to the I/O unit.

10 Claims, 8 Drawing Sheets

COMPUTER SYSTEM AND DATA PROCESSING METHOD

BACKGROUND OF THE INVENTION

1. Field of the Invention

The present invention relates to a computer system and a data processing method which is adapted thereto, and, more particularly, to a computer system with a diagnosis capability, which has a simple system architecture, and a data processing method to be adapted thereto.

2. Description of the Related Art

Some computer systems are equipped with a service processor (SVP) in addition to a main processor. The SVP is, for example, a so-called sub system independent of the computer system and is used in, for example, failure diagnosis of hardware. The SVP is connected to an input/output (I/O) unit located outside the computer system and receives an instruction to diagnose, for example, the operational status of the hardware of the computer system from the I/O unit. The SVP also transmits information representing diagnosis results to the I/O unit in accordance with an instruction from the I/O unit.

As mentioned above, an I/O unit (console for the SVP) which gives an instruction to the SVP is connected to an SVP-equipped computer system. In addition to this I/O unit, an I/O unit (console for the main processor) which inputs an instruction to the main processor is connected to the computer system. The connection of plural I/O units has made the system architecture of conventional computer system relatively complex.

The complex system architecture is particularly noticeable in a multi-processor computer system having a plurality of main processors. To be more specific, a multi-processor computer system is connected with consoles for the individual main processors in addition to a console for the SVP. Because the main-processor consoles were needed by the number of the main processors, the system architecture was more complicated.

A computer system which has overcome the complexity of the system architecture is disclosed in, for example, Unexamined Japanese Patent Application KOKAI Publication No. H9-114789. In this computer system, a single I/O unit (main-processor console) selects one of plural main processors which should execute a predetermined process and allows the selected main processor to perform the process.

As this computer system employs the structure that requires a SVP for each main processor, however, there is some room for improvement in simplifying the architecture of the computer system by reducing the number of SVPs.

SUMMARY OF THE INVENTION

Accordingly, it is an object of the invention to provide a computer system with a simple system architecture and a data processing method to be adapted thereto.

It is another object of the invention to provide a computer system with a diagnosis capability, which can reduce the number of I/O units (consoles) to connect to the computer system, and a data processing method to be adapted thereto.

To achieve the objects, a computer system according to the first aspect of the invention comprises at least one main processor; a sub processor connected to an input/output unit which is operated by an operator; and a crossbar switch, connected to the at least one main processor and the sub processor, for transferring data between the main processor and the sub processor, the crossbar switch including a diagnosis section which diagnoses a failure in the main processor in accordance with a command input from the input/output unit and given to the sub processor. The diagnosis section is capable of receiving data to be transmitted to the main processor from the input/output unit via the sub processor and causing the main processor to read the data, and receiving data to be transmitted to the input/output unit from the main processor and transmitting the data to the input/output unit via the sub processor.

According to the computer system having the above-described structure, the sub processor or the like executes a failure diagnosis in accordance with an instruction input from the input/output unit. Data to be transmitted to the main processor is transmitted to the main processor from the input/output unit via the crossbar switch, the sub processor and so forth and the main processor executes a predetermined process based on the data. Data to be transmitted to the input/output unit is transmitted to the input/output unit from the main processor via the crossbar switch, the sub processor and so forth. It is therefore unnecessary to separately connect an input/output unit for the sub processor and an input/output unit for the main processor to the computer system, making is possible to reduce the number of input/output units to connect to the computer system. The computer system therefore has a simple system architecture.

The diagnosis section may include a serial controller having a first memory section where data to be transmitted to the input/output unit from the at least one main processor is written by the main processor, and a second memory section where data to be transmitted to the main processor from the input/output unit is written by the sub processor.

A first address for allowing the at least one main processor to write data in the first memory section and a second address for allowing the sub processor to write data in the second memory section may be allocated to the serial controller.

The serial controller may give an instruction to read a memory content from the first memory section to the sub processor when data is written in the first memory section by the at least one main processor, and give a permission for interruption to the sub processor when a request to write data into the second memory section has been made by the sub processor and is interruptible.

The diagnosis section may further include at least one register which stores data representing a result of a failure diagnosis, and the sub processor may read the data representing the result of the failure diagnosis from the register in accordance with an instruction given from the input/output unit and send the read data to the input/output unit.

The diagnosis section may include a plurality of serial controllers respectively corresponding to a plurality of main processors, and the sub processor may write data to be transmitted to one of the plurality of main processors, which is input from the input/output unit, in the second memory section of that serial controller which corresponds to the main processor where the data is to be transmitted by designating an address of that serial controller.

The input/output unit may give an instruction to the sub processor, allow the sub processor to execute a process based on the instruction, receive data representing a result of the process from the sub processor, give an instruction to the at least one main processor via the sub processor and the diagnosis section, allow the main processor to execute a process based on that instruction, receive data representing a result of that process via the diagnosis section and the sub processor section, so that the input/output unit serves as a common console for the sub processor and the main processor.

To achieve the objects, according to the second aspect of the invention, there is provided a data processing method for use in a computer system comprising at least one main processor, a sub processor connected to an input/output unit which is operated by an operator, and a diagnosis section which is connected to the main processor and the sub processor and diagnoses a failure in the main processor together with the sub processor in accordance with a command given from the input/output unit. The method comprises the steps of transmitting first data to be transmitted to the at least one main processor to the sub processor from the input/output unit, allowing the sub processor to store the transmitted first data in the diagnosis section, allowing the main processor to read the first data stored in the diagnosis section and allowing the main processor to execute a process based on the read first data; and allowing the main processor to store second data to be transmitted to the input/output unit in the diagnosis section, allowing the sub processor to read the stored second data from the diagnosis section and transmit the second data to the input/output unit and allowing the input/output unit to display contents of the transmitted second data.

According to the method, the sub processor or the like executes a failure diagnosis in accordance with an instruction input from the input/output unit. First data to be transmitted to the main processor is transmitted to the main processor from the input/output unit via the sub processor, the diagnosis section and so forth. Second data to be transmitted to the input/output unit is transmitted to the input/output unit from the main processor via the diagnosis section, the sub processor and so forth. This can allow the input/output unit to serve as not only a console for the sub processor but also a console for the main processor. It is therefore unnecessary to separately connect a console for the sub processor and a console for the main processor to the computer system, making is possible to reduce the number of consoles (input/output units) to connect to the computer system. The reduction in the quantity of input/output units to connect to the computer system can make the structure of the computer system simpler.

The diagnosis section may include a serial controller having a first memory section for storing the first data to be transmitted to the input/output unit from the at least one main processor, and a second memory section for storing the second data to be transmitted to the main processor from the input/output unit, and a first address which is designated by the at least one main processor and a second address which is designated by the sub processor may be allocated to the serial controller.

Serial controllers respectively corresponding to plurality of main processors may be provided in the diagnosis section, the sub processor may store the second data to be transmitted to one of the plurality of main processors in that serial controller which corresponds to the main processor where the second data is to be transmitted, and the main processor where the second data is to be transmitted may read the second data stored in that serial controller and executes a process based on the second data.

DETAILED DESCRIPTION OF THE PREFERRED EMBODIMENTS

Computer systems according to preferred embodiments of the invention and data processing methods which are to be adapted thereto will be elaborated below with reference to FIGS. 1 through 7.

(First Embodiment)

Figure 1:
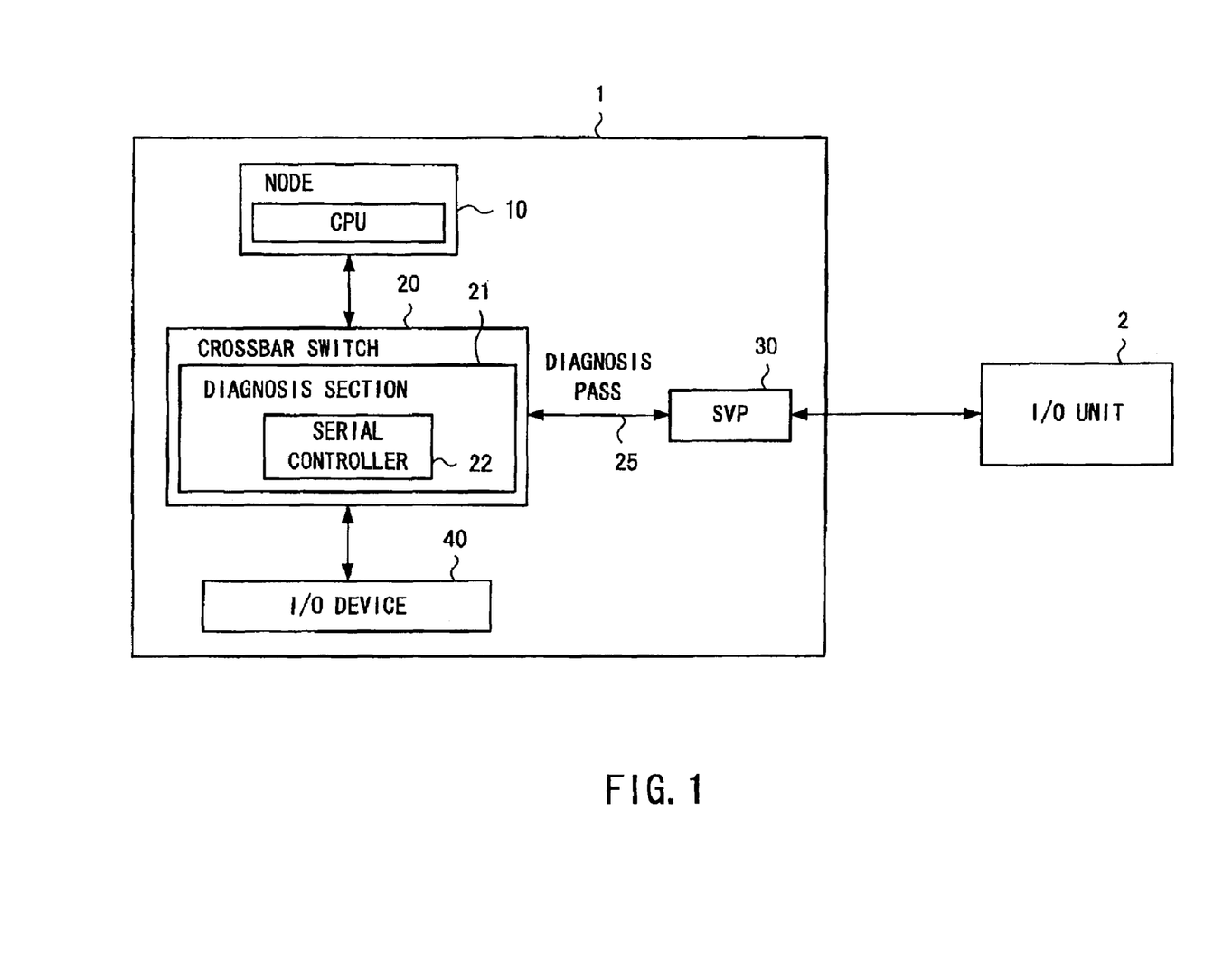
FIG. 1 is a block diagram showing the structure of a computer system according to a first embodiment of the invention.

As shown in FIG. 1, a computer system 1 according to the embodiment comprises a node 10, a crossbar switch 20, a service processor (SVP) 30 and an input/output (I/O) device 40. An input/output (I/O) unit 2 is connected to the computer system 1 via the SVP 30.

The I/O unit 2 will be discussed first. The I/O unit 2 is constituted by a general-purpose computer equipped with peripheral devices, such as a keyboard, a mouse and a display. The I/O unit 2 instructs, for example, the SVP 30 to execute a failure diagnosis of the hardware of the computer system 1 or receives information representing failure diagnosis results from the SVP 30. That is, the I/O unit 2 serves as a console for the SVP (hereinafter simply referred to as "SVP console").

By running an emulation program stored in a memory or the like (not shown), the I/O unit 2 also serves as a console for the node 10 of the computer system 1. For instance, the I/O unit 2 provides an operator with interaction means with an operating system (OS) which operates the computer system 1 and transmits various instructions for the node 10 to the computer system 1. The I/O unit 2 receives various kinds of data transmitted from the computer system 1.

The structure of the computer system 1 will be discussed next.

The node 10 is constituted by, for example, a CPU (Central Processing Unit). The node 10 executes various processes under the control of the OS. The node 10 sends data to the I/O device 40 and receives data from the I/O device 40, via the crossbar switch 20 in both events. Further, the node 10 receives an instruction from the I/O unit 2 that is serving as the console for the node 10 and sends data representing the results of a predetermined process executed according to the instruction, via the crossbar switch 20 and SVP 30 in both events.

Data to be transmitted to the node 10 from the I/O unit 2 that is serving as the console for the node 10 will be called as "console input data" (for example, a command, etc.) and data to be transmitted to the I/O unit 2 from the node 10 will be called as "console output data" (for example, an error message of OS, etc.) hereinafter.

The crossbar switch 20 serves as an internal communication mechanism which automatically selects a communication path at the time when communication is made between the node 10 and the I/O device 40 and between the node 10 and the SVP 30. The crossbar switch 20 has a diagnosis section 21.

The diagnosis section 21, together with the node 10, the SVP 30 and so forth, diagnoses a failure in the hardware of the computer system 1. The diagnosis section 21 has at least one register (hereinafter, "diagnosis register") (not shown) which stores data representing the results of the failure diagnosis and an instruction (command) for the failure diagnosis. The diagnosis section 21 further has a serial controller 22.

Figure 2:
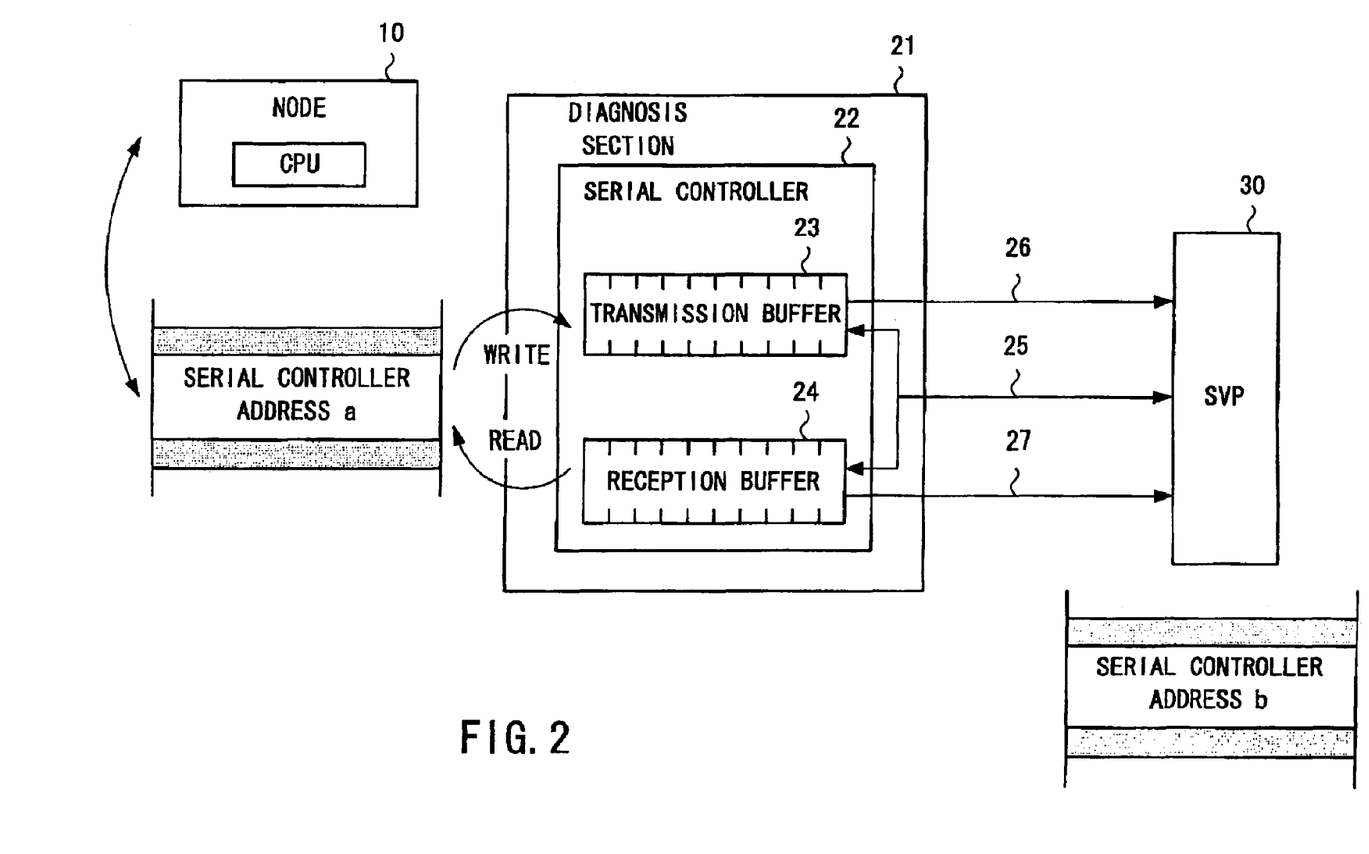
FIG. 2 is a diagram for explaining transmission and reception of data between a node shown in FIG. 1 and an SVP shown in FIG. 1.
Figure 8:
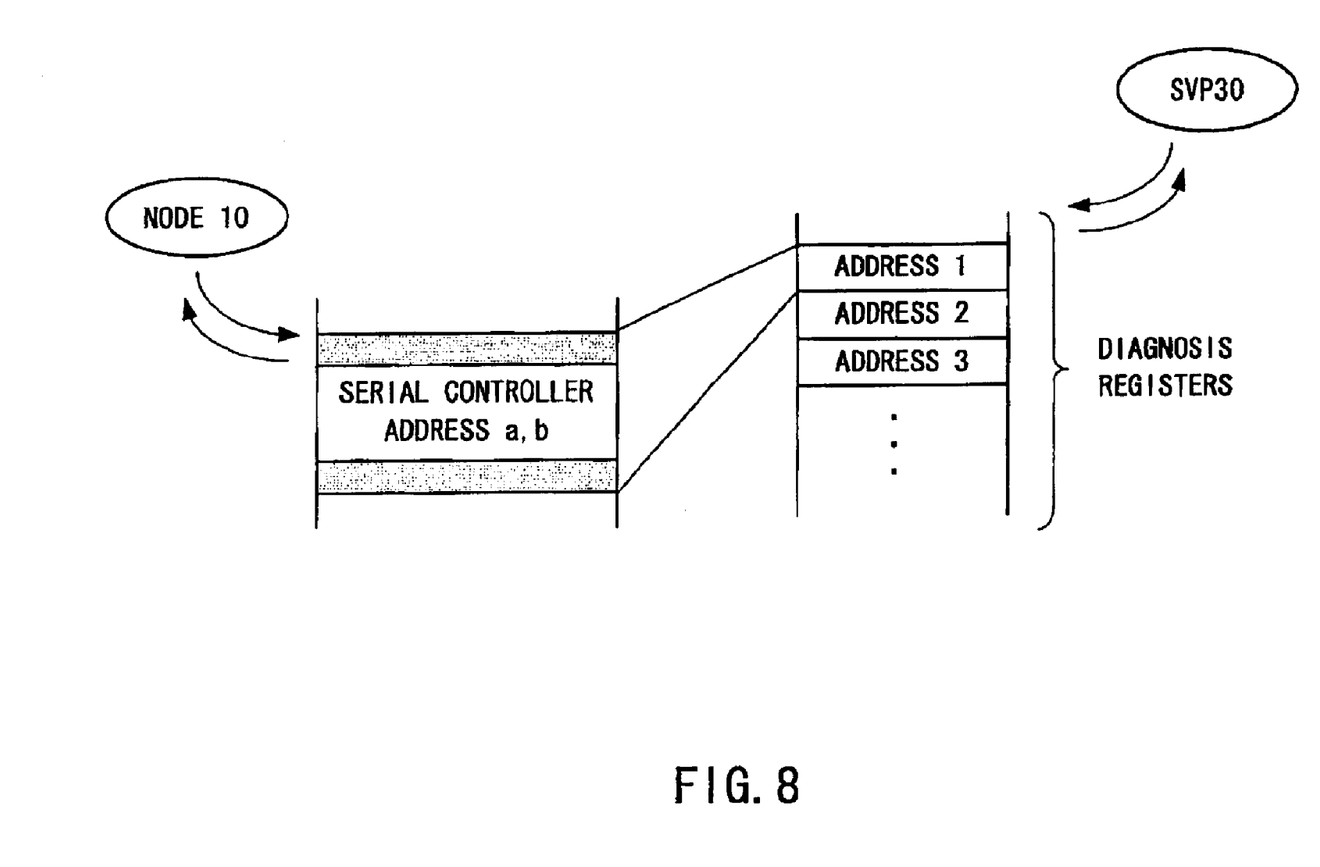
FIG. 8 is a diagram for explaining serial controller addresses allocated to the serial controller shown in FIG. 2.

The serial controller 22 exchanges console input/output data between the node 10 and the SVP 30, as shown in FIG. 2. As shown in FIG. 2, a serial controller address a and a serial controller address b are allocated to the serial controller 22. As shown in FIG. 8, both the serial controller addresses a and b are part of the address which is allocated to one of the diagnosis register.

The serial controller address a is designated by the node 10 when the node 10 sends (writes) console output data to the serial controller 22 or receives (reads) console input data from the serial controller 22.

The serial controller address b is designated by the SVP 30 when the SVP 30 sends console input data to the serial controller 22 via a diagnosis path 25 or receives console output data from the serial controller 22.

The serial controller 22 has a transmission buffer 23 for storing console output data sent from the node 10 and a reception buffer 24 for storing console input data sent from the SVP 30.

The transmission buffer 23 and the reception buffer 24 are constituted by, for example, a ring buffer having a predetermined capacity. The serial controller 22 receives the console output data sent from the node 10 and stores the data into the transmission buffer 23. The serial controller 22 also receives the console input data sent from the SVP 30 via the diagnosis path 25 and stores the data in the reception buffer 24.

In case of having stored the console output data sent from the node 10 into the transmission buffer 23, the serial controller 22 sends a signal (transmission interrupt signal) to the SVP 30 via a transmission interrupt signal line 26 and request the SVP 30 to read the console output data stored in the transmission buffer 23.

In response to the request to write the console input data in the reception buffer 24 from the SVP 30, the serial controller 22 sends a signal (reception interrupt signal) via a reception interrupt signal line 27 when the console input data is storable in the reception buffer 24. This notifies the SVP 30 that reception and storage of the console input data are possible.

The operation for the communication via the serial controller 22 will be discussed later.

The SVP 30 shown in FIG. 1, together with the node 10 and the diagnosis section 21, diagnoses a failure in the hardware of the computer system 1 by running a diagnosis program or the like in accordance with a failure diagnosis instruction. The SVP 30 stores an instruction (command) for a failure diagnosis in the diagnosis register of the diagnosis section 21 via the diagnosis path 25. The SVP 30 reads information representing the results of the failure diagnosis stored in the diagnosis register via the diagnosis path 25 from the diagnosis register.

As the failure diagnosis on the hardware of the computer system 1 by the SVP 30 and the diagnosis section 21 is well known to those skilled in the art, the detailed description of the failure diagnosis will not be given in this specification.

The SVP 30 receives the console input data sent from the I/O unit 2 and writes the data in the reception buffer 24 in the serial controller 22. Further, the SVP 30 reads the console output data written in the transmission buffer 23 by the node 10 and sends the data to the I/O unit 2.

The communication process between the SVP 30 and the serial controller 22 will be discussed in detail referring to FIG. 2. In case of reading console output data from the transmission buffer 23, the SVP 30 first receives a transmission interrupt signal from the serial controller 22 via the transmission interrupt signal line 26 and accepts a request from the serial controller 22 to read console output data stored in the transmission buffer 23. In response to the request, the SVP 30 designates the serial controller address b and reads the console output data from the transmission buffer 23.

In case of storing console input data in the reception buffer 24, on the other hand, the SVP 30 first discriminates whether the reception interrupt signal has been output from the serial controller 22 or not. Accordingly, the SVP 30 discriminates whether or not the serial controller 22 can store console input data in the reception buffer 24. When having discriminated that the reception interrupt signal has been output from the serial controller 22 via the reception interrupt signal line 27, the SVP 30 designates the serial controller address b and stores the console input data in the reception buffer 24.

The I/O device 40 shown in FIG. 1 is comprised of a peripheral device, such as a magnetic drive unit or a printer. The I/O device 40 operates according to the control of the node 10. The node 10 carries out data transmission and reception to each I/O device 40.

Figure 3:
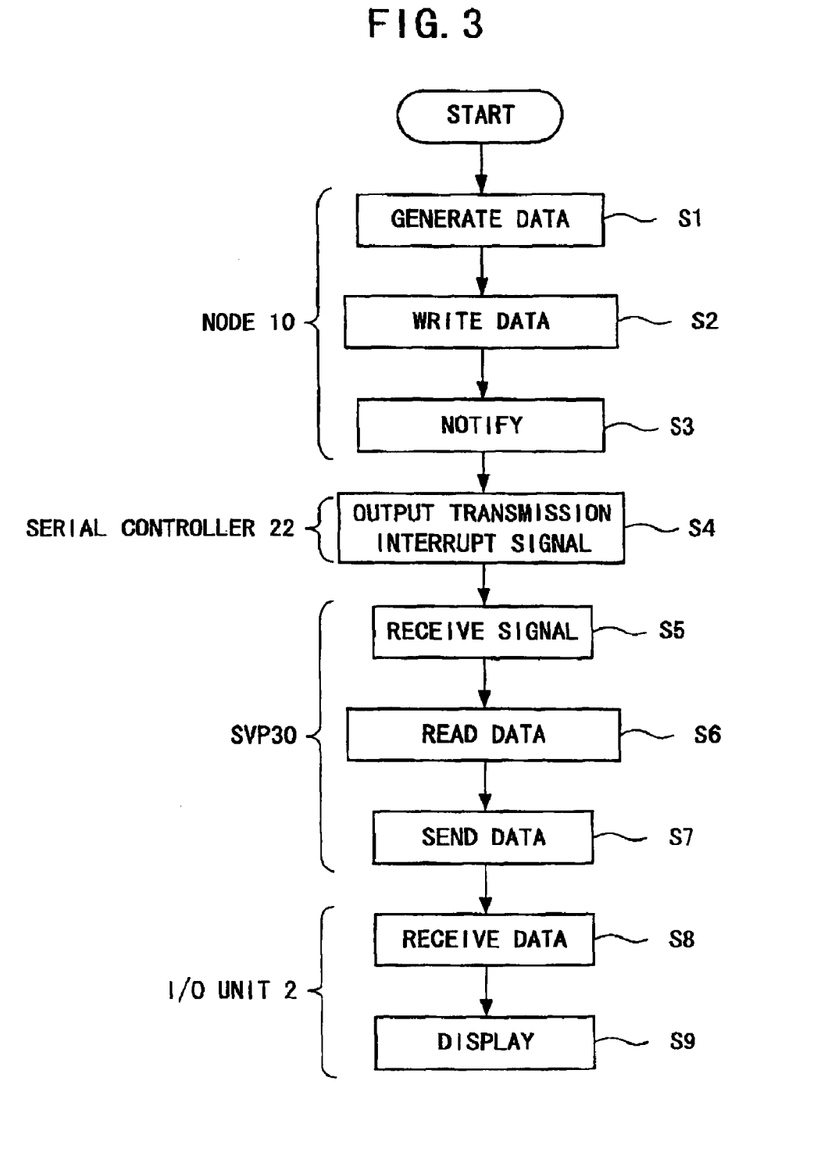
FIG. 3 is a flowchart for explaining the operation of the computer system shown in FIG. 1.
Figure 4:
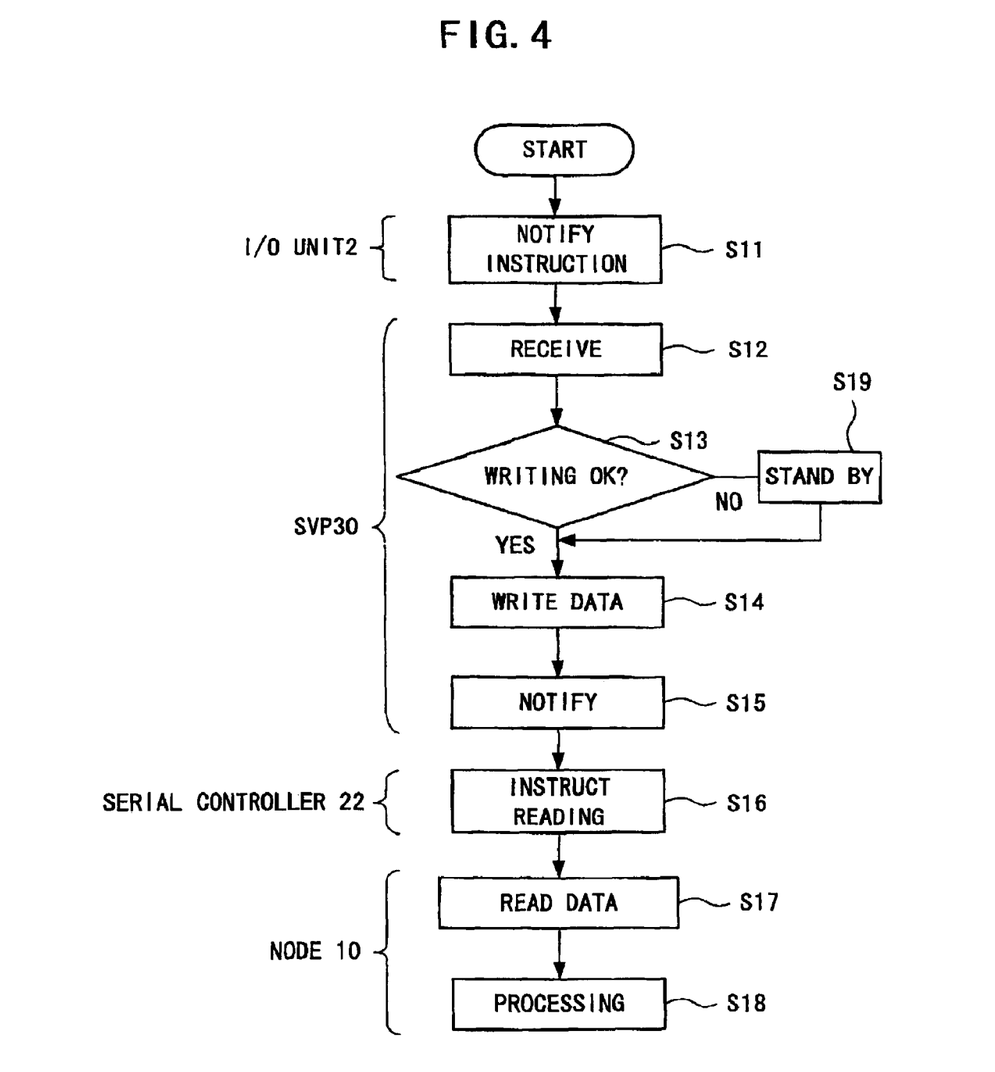
FIG. 4 is a flowchart for explaining the operation of the computer system shown in FIG. 1.

The operation of the computer system 1 having the above-described structure will be discussed below referring to FIGS. 3 and 4.

To begin with, referring to FIG. 3, a description will be given of a process to be executed in the case where the node 10 of the computer system 1 sends console output data to the I/O unit 2 that serves as the console for the node 10. This process is repeatedly executed under the control of the OS or the like.

The node 10 executes a predetermined process under the control of the OS and generates data representing the results of the process (console output data: for example, data representing an error message of OS) (step S1). Next, the node 10 designates the serial controller address a and stores the generated data (console output data) in the transmission buffer 23 in the serial controller 22 (step S2). When data storage is completed, the node 10 notifies the serial controller 22 of that event (step S3).

In response to the notification, the serial controller 22 sends the transmission interrupt signal to the SVP 30 via the transmission interrupt signal line 26 to instructs reading of data stored in the transmission buffer 23 (step S4).

The SVP 30 receives the transmission interrupt signal (step S5). In response to the instruction from the serial controller 22, the SVP 30 designates the serial controller address b and reads the data from the transmission buffer 23 (step S6). Then, the SVP 30 sends the data to the I/O unit 2 (step S7).

The I/O unit 2 receives the data (step S8). Then, the I/O unit 2 displays (outputs) the contents of the received data as console data for the computer system 1 on the display (step S9).

Next, referring to FIG. 4, a description will be given of a process to be executed in the case where the I/O unit 2 that serves as the console for the node 10 sends console input data (e.g., a command) to the node 10. This process is repeatedly executed under the control of the I/O unit 2 or the like.

As an operator inputs a predetermined sequence of characters using, for example, the keyboard of the I/O unit 2, console input data (a predetermined instruction to the node 10) is transmitted to the SVP 30 from the I/O unit 2 (step S11).

The SVP 30 receives the data (step S12). Next, the SVP 30 request the serial controller 22 to write data (console input data) in the reception buffer 24. In response to the request, the serial controller 22 sends the reception interrupt signal to the SVP 30 via the reception interrupt signal line 27 when data writing (interrupt) is possible. When data writing is not possible, on the other hand, the serial controller 22 does not send the reception interrupt signal to the SVP 30.

The SVP 30 discriminates whether or not the serial controller 22 is in a data receivable state based on the presence/absence of the reception interrupt signal (step S13). When having discriminated that the reception interrupt signal has been sent from the serial controller 22 (step S13: YES), the SVP 30 designates the serial controller address b and stores the data received from the I/O unit 2 in the reception buffer 24 (step S14). When writing is completed, the SVP 30 notifies the serial controller 22 of that event (step S15).

In response to the notification, the serial controller 22 instructs the node 10 to read data stored in the reception buffer 24 (step S16).

In response to the instruction, the node 10 designates the serial controller address a and reads data stored in the reception buffer 24 as input data from the I/O unit 2 (step S17). Then, the node 10 executes a process based on the read-out data (step S18).

When having discriminated in step S13 that the reception interrupt signal has not been sent from the serial controller 22 (step S13: NO), the SVP 30 stands by until it receives the reception interrupt signal from the serial controller 22 (step S19). After reception of the reception interrupt signal, the SVP 30 proceeds to step S14.

As described above, the diagnosis section 21 and the SVP 30 for diagnosing a failure in the node 10 or the like are provided between the node 10 and the I/O unit 2 in the computer system 1 according to the embodiment. The diagnosis section 21 has the serial controller 22 which exchanges console output data and console input data between the node 10 and the SVP 30.

The I/O unit 2 connected to the SVP 30 can give the node 10 an instruction to execute various processes using the SVP 30 and the serial controller 22 as well as can give the SVP 30 or the like an instruction for a failure diagnosis. Therefore, it is unnecessary to separately connect an I/O unit for inputting an instruction to the SVP 30 or the like and an I/O unit for inputting an instruction to the node 10 to the computer system 1 according to the embodiment. The single I/O unit 2 connected to the computer system 1 can serve as both the SVP console and the main-processor console. The reduction in the number of I/O units 2 to connect to the computer system 1 makes the system architecture of the computer system simpler.

(Second Embodiment)

The foregoing description of the first embodiment has been given of the case where the computer system 1 has a single node 10 as one example. In general, however, the computer system 1 has a plurality of nodes 10 for the purpose of, for example, improving the processing speed and the I/O unit 2 is connected to the computer system 1 for each node 10. To simplify the system architecture by reducing the number of I/O units 2 to connect to the computer system 1, the computer system 1 has only to be equipped with a plurality of serial controllers 22 corresponding to the plural nodes 10.

The following description of the second embodiment will be given of the case where the computer system 1 has four nodes 10 and four serial controllers 22 as one example.

Figure 5:
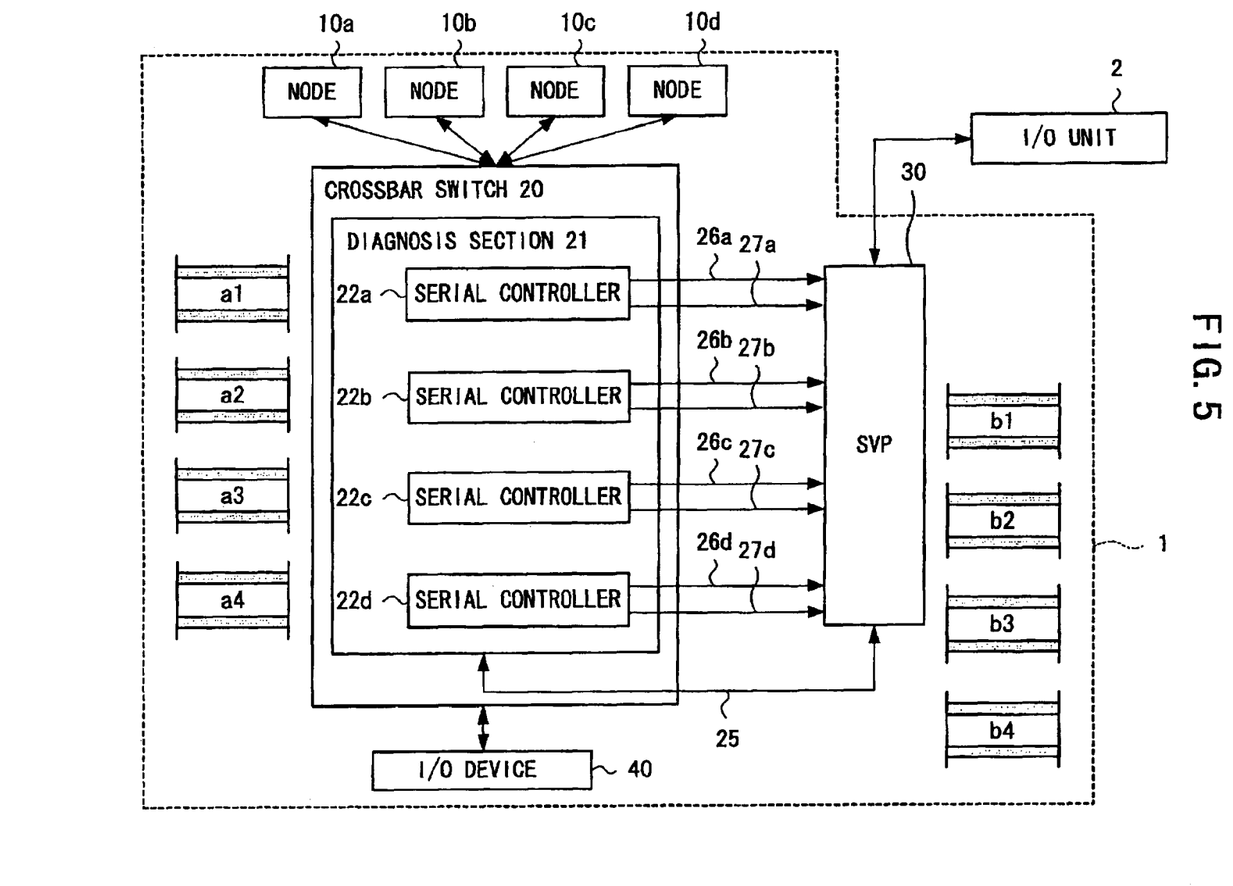
FIG. 5 is a block diagram showing the structure of a computer system according to a second embodiment of the invention.

As shown in FIG. 5, the computer system 1 has a node 10a, node 10b, node 10c and node 10d. The nodes 10a to 10d are all connected to the crossbar switch 20.

The diagnosis section 21 in the crossbar switch 20 has serial controllers 22a, 22b, 22c and 22d. The serial controllers 22a, 22b, 22c and 22d respectively correspond to the nodes 10a, 10b, 10c and 10d. The serial controllers 22a, 22b, 22c and 22d are connected to the SVP 30 via transmission interrupt signal lines 26a, 26b, 26c and 26d and reception interrupt signal lines 27a, 27b, 27c and 27d, respectively.

Serial controller addresses a1, a2, a3 and a4 and serial controller addresses b1, b2, b3 and b4 are respectively allocated to the serial controllers 22a, 22b, 22c and 22d. The addresses that the nodes 10a to 10d can designate are only those respectively allocated to the serial controllers 22a to 22d. For example, the address that the node 10c can designate is the address (serial controller address a3) that is allocated to the serial controller 22c.

Figure 6:
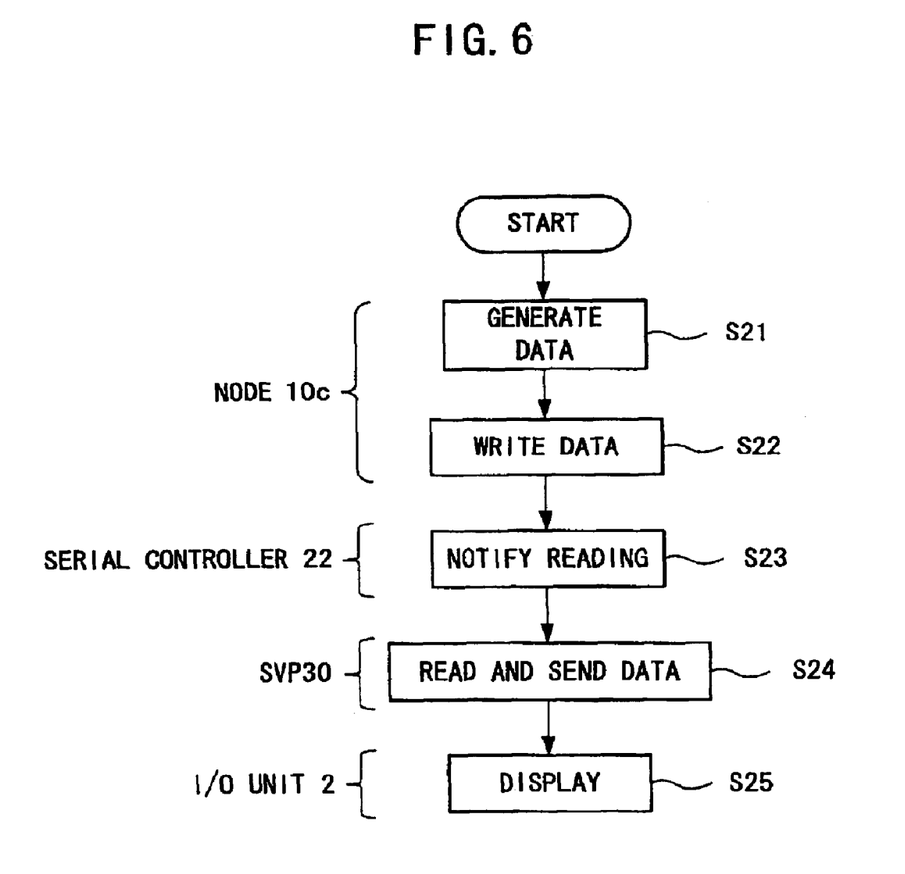
FIG. 6 is a flowchart for explaining the operation of the computer system shown in FIG. 5.
Figure 7:
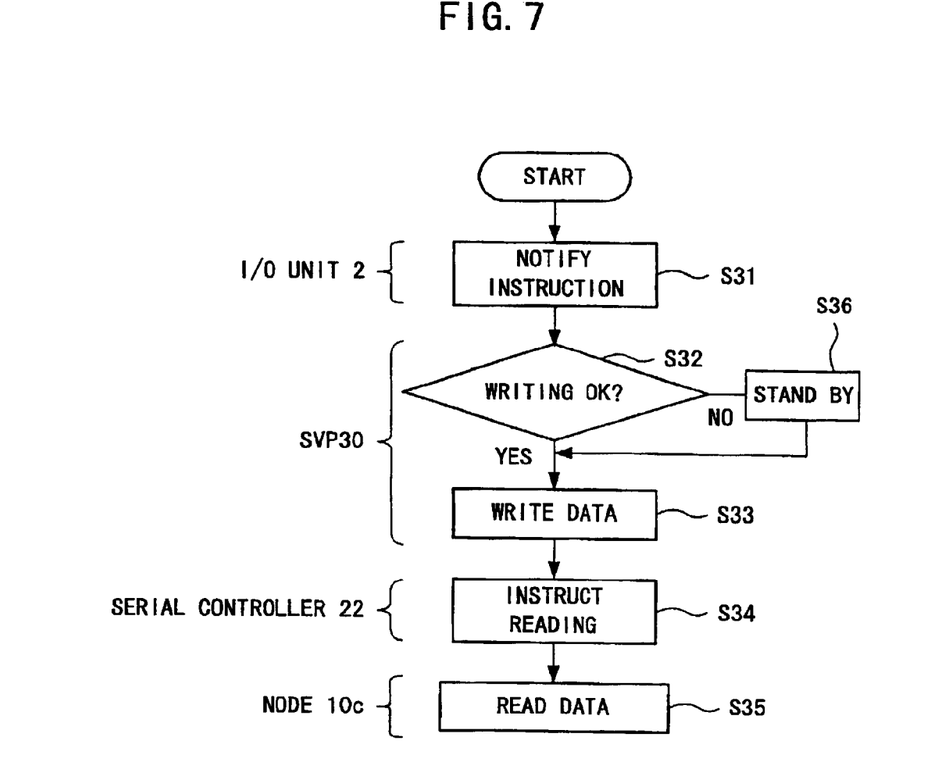
FIG. 7 is a flowchart for explaining the operation of the computer system shown in FIG. 5.

The operation of the computer system 1 according to the embodiment will be discussed next referring to FIGS. 6 and 7. The following description is given of transmission of console output data to the I/O unit 2 from the node 10c and transmission of console input data to the node 10c from the I/O unit 2 as an example.

To begin with, the operation at the time of sending console output data will be described referring to FIG. 6.

The node 10c generates console output data directed to the I/O unit 2 (step S21). Next, the node 10c designates the serial controller address a3 and writes the generated data in the transmission buffer of the serial controller 22c (step S22). When data writing is completed, the node 10c notifies the serial controller 22c of that event.

In response to the notification, the serial controller 22c sends the transmission interrupt signal to the SVP 30 via the transmission interrupt signal line 26c (step S23).

The SVP 30 receives the transmission interrupt signal (step S24). Next, the SVP 30 designates the serial controller address b3 to read data from the transmission buffer and sends the data to the I/O unit 2 (step S24). The I/O unit 2 receives the data and displays the contents of the data on the display (step S25).

Next, the operation at the time of sending console input data to the node 10c from the I/O unit 2 will be described referring to FIG. 7.

Through an input operation by an operator, the I/O unit 2 sends console input data (command for the node 10) to the SVP 30 (s31).

The SVP 30 receives the console input data and discriminates whether or not the reception interrupt signal is output from the serial controller 22c via the reception interrupt signal line 27c. That is, the SVP 30 discriminates whether or not the reception buffer of the serial controller 22c is in a data writable state (step S32). When having discriminated that the reception interrupt signal has been transmitted (step S32: YES), the SVP 30 designates the serial controller address b3 and writes data in the reception buffer of the serial controller 22c (step S33). When completing data writing, the SVP 30 notifies the serial controller 22c of that event.

In response to the notification, the serial controller 22c instructs the node 10c to read data from the reception buffer (step S34). In response to the instruction, the node 10c designates the serial controller address a3 and reads data from the reception buffer (step S35). Then, the node 10c processes the read data.

When having discriminated in step S32 that the reception buffer is not in a data writable state (step S32: NO), the SVP 30 stands by until it receives the reception interrupt signal from the serial controller 22c. Upon reception of the reception interrupt signal, the SVP 30 proceeds to step S33.

In short, the computer system 1 according to the embodiment has the serial controllers 22a, 22b, 22c and 22d respectively corresponding to the nodes 10a, 10b, 10c and 10d. This can allow the single I/O unit 2 and SVP 30 to send and receive console input/output data node by node without comprising a plurality of I/O units 2 or a plurality of SVPs 30.

The invention is not limited to the above-described embodiments. Although the foregoing descriptions of the first and second embodiments have been given of the case, as an example, where the serial controller 22 intervenes to exchange data between the node 10 and the I/O unit 2, a parallel controller may intervene in data exchange in place of the serial controller 22.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-198991 filed on Jul. 8, 2002 and including specification, claims, drawings and summary. The disclosure of the above Japanese Patent Application is incorporated herein by reference in its entirety.

What is claimed is:

1. A computer system comprising:
   at least one main processor;
   a sub processor connected to an input/output unit which is operated by an operator; and
   a crossbar switch, connected to said at least one main processor and said sub processor, for transferring data between said main processor and said sub processor, said crossbar switch including a diagnosis section which diagnoses a failure in said main processor in accordance with a command input from said input/output unit and given to said sub processor,
   said diagnosis section being capable of receiving data to be transmitted to said main processor from said input/output unit via said sub processor and causing said main processor to read said data, and receiving data to be transmitted to said input/output unit from said main processor and transmitting said data to said input/output unit via said sub processor.

2. The computer system according to claim 1, wherein said diagnosis section includes a serial controller having a first memory section where data to be transmitted to said input/output unit from said at least one main processor is written by said main processor, and a second memory section where data to be transmitted to said main processor from said input/output unit is written by said sub processor.

3. The computer system according to claim 2, wherein allocated to said serial controller are a first address for allowing said at least one main processor to write data in said first memory section and a second address for allowing said sub processor to write data in said second memory section.

4. The computer system according to claim 3, wherein said serial controller
   gives an instruction to read a memory content from said first memory section to said sub processor when data is written in said first memory section by said at least one main processor, and
   gives a permission for interruption to said sub processor when a request to write data into said second memory section has been made by said sub processor and is interruptible.

5. The computer system according to claim 4, wherein said diagnosis section further includes at least one register which stores data representing a result of a failure diagnosis, and
   said sub processor reads said data representing said result of said failure diagnosis from said register in accordance with an instruction given from said input/output unit and sends said read data to said input/output unit.

6. The computer system according to claim 4, wherein said diagnosis section includes a plurality of serial controllers respectively corresponding to a plurality of main processors, and
   said sub processor writes data to be transmitted to one of said plurality of main processors, which is input from said input/output unit, in said second memory section of that serial controller which corresponds to said main processor where said data is to be transmitted by designating an address of that serial controller.

7. The computer system according to claim 6, wherein said input/output unit gives an instruction to said sub processor, allows said sub processor to execute a process based on said instruction, receives data representing a result of said process from said sub processor, gives an instruction to said at least one main processor via said sub processor and said diagnosis section, allows said main processor to execute a process based on that instruction, receives data representing a result of that process via said diagnosis section and said sub processor section, said input/output unit serves as a common console for said sub processor and said main processor.

8. A data processing method for use in a computer system comprising at least one main processor, a sub processor connected to an input/output unit which is operated by an operator, and a diagnosis section which is connected to said main processor and said sub processor and diagnoses a failure in said main processor together with said sub processor in accordance with a command given from said input/output unit, said method comprising the steps of:
   transmitting first data to be transmitted to said at least one main processor to said sub processor from said input/output unit, allowing said sub processor to store said transmitted first data in said diagnosis section, allowing said main processor to read said first data stored in said diagnosis section and allowing said main processor to execute a process based on said read-out first data; and
   allowing said main processor to store second data to be transmitted to said input/output unit in said diagnosis section, allowing said sub processor to read said stored second data from said diagnosis section and transmit said second data to said input/output unit and allowing said input/output unit to display contents of said transmitted second data.

9. The data processing method according to claim 8, wherein said diagnosis section includes a serial controller having a first memory section for storing said first data to be transmitted to said input/output unit from said at least one main processor, and a second memory section for storing said second data to be transmitted to said main processor from said input/output unit, and     a first address which is designated by said at least one main processor and a second address which is designated by said sub processor are allocated to said serial controller.

10. The data processing method according to claim 9, wherein serial controllers respectively corresponding to plurality of main processors are provided in said diagnosis section, said sub processor stores said second data to be transmitted to one of said plurality of main processors in that serial controller which corresponds to said main processor where said second data is to be transmitted, and said main processor where said second data is to be transmitted reads said second data stored in that serial controller and executes a process based on said second data.

\* \* \* \* \*